United States Patent
Fulton et al.

(10) Patent No.: US 8,596,064 B2
(45) Date of Patent: Dec. 3, 2013

(54) METHOD AND SYSTEM FOR LIMITING OUTPUT OF A BOOSTED ENGINE

(75) Inventors: Brien Lloyd Fulton, West Bloomfield, MI (US); Gopal Krishna Chamarthi, Saline, MI (US); Dean Pennala, Howell, MI (US); David Curtis Ives, Ann Arbor, MI (US); David Robert Nader, Farmington Hills, MI (US); Paul Martin Niessen, Plymouth, MI (US); Jason Ronald Smith, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 12/915,592

(22) Filed: Oct. 29, 2010

(65) Prior Publication Data

US 2012/0102944 A1 May 3, 2012

(51) Int. Cl.
*F02B 33/44* (2006.01)
*F01N 3/00* (2006.01)
*F01N 3/02* (2006.01)

(52) U.S. Cl.
USPC ............ 60/605.1; 60/274; 60/280; 60/285; 60/295; 60/311

(58) Field of Classification Search
USPC ........... 60/274, 280, 285, 287, 291, 295, 297, 60/311, 605.1, 611
See application file for complete search history.

(56) References Cited

U.S. PATENT DOCUMENTS

| 4,469,066 A * | 9/1984 | Yuzawa ..................... 123/380 |
| 5,785,023 A * | 7/1998 | Cross ........................... 123/463 |
| 6,785,604 B2 | 8/2004 | Jacobson |
| 6,886,335 B2 | 5/2005 | Tabata et al. |
| 2006/0070381 A1 | 4/2006 | Parlow et al. |
| 2007/0220866 A1* | 9/2007 | Nishiumi ..................... 60/286 |
| 2009/0090107 A1 | 4/2009 | Youssef et al. |
| 2009/0217663 A1 | 9/2009 | Buis et al. |
| 2010/0229538 A1* | 9/2010 | Bloms et al. ................ 60/295 |
| 2011/0094221 A1* | 4/2011 | Ge et al. ..................... 60/602 |

* cited by examiner

*Primary Examiner* — Kenneth Bomberg
*Assistant Examiner* — Audrey K Bradley
(74) *Attorney, Agent, or Firm* — Julia Voutyras; Alleman Hall McCoy Russell & Tuttle LLP

(57) ABSTRACT

A method for operating a turbocharged engine is disclosed. In one example, an engine operation is adjusted in response to a turbocharger expansion ratio. Degradation of the engine may be reduced under some engine operating conditions by adjusting engine operation in response to the turbocharger expansion ratio.

19 Claims, 4 Drawing Sheets

METHOD AND SYSTEM FOR LIMITING OUTPUT OF A BOOSTED ENGINE

BACKGROUND/SUMMARY

Degradation of a turbocharger may be reduced by limiting turbocharger operation to selected operating conditions. In U.S. Patent Application 2009/0090107 a model is used to estimate turbocharger speed, and a turbine actuator control law is estimated by mapping the turbine from a measurement of flow into the turbine and from a desired ratio of the pressures in the turbine. The approach then adjusts a turbine actuator to modify the turbocharger turbine geometry. The actuator modifies the flow rate to the turbine so that pressure in the intake manifold is equal to a set point pressure. However, the method appears to overlook that it may be undesirable to operate the turbocharger at a turbine expansion ratio that exceeds a turbine expansion ratio limit. Consequently, the approach may accelerate turbocharger degradation during some operating conditions.

The inventors herein have recognized engine operating conditions where it may not be desirable to operate an engine when a turbine expansion ratio exceeds a turbine expansion ratio limit. Further, the inventors have recognized that different turbine expansion ratio limits are desirable for different exhaust flow rates. For example, it may not be desirable to operate an engine to regenerate a particulate filter when regenerating the particulate filter or the method of regenerating the particulate filter can cause a turbine expansion ratio to exceed a turbine expansion ratio limit. Further, if an operator fails to change an air cleaner element, the turbine expansion ratio limit may be exceeded thereby leading to turbocharger degradation. However, it may be desirable to permit a higher turbine expansion ratio limit at low engine speeds when exhaust flow rates are lower and turbocharger degradation is less likely so that the driver may have an expected level of engine performance or particulate filter regeneration function.

The inventors herein have recognized the above-mentioned disadvantages and have developed an engine operating method, comprising: operating an engine with a turbocharger; adjusting operation of the engine in response to a turbine expansion ratio exceeding a turbine expansion ratio limit of the turbocharger, the turbine expansion ratio limit varying in response to an exhaust gas flow rate.

By adjusting operation of an engine in response to a turbine expansion ratio limit, engine operation can be limited such that the possibility of turbocharger degradation may be limited. For example, if a particulate filter is scheduled to regenerate a higher altitude the particulate filter regeneration can be delayed until then engine is at a lower altitude or different operating mode when regeneration can be enabled. Further, if during normal engine operation the turbine expansion ratio exceeds a desired expansion ratio limit, the engine output or other operating parameters can be reduced so as to reduce the possibility of operating the turbocharger turbine at an expansion ratio that exceeds a turbine expansion ratio limit.

The present description may provide several advantages. For example, the approach may reduce the possibility of turbocharger degradation. Further, the approach may provide an improved basis for turbine expansion ratio limits. Further still, the approach may be beneficial for improving a variety of engine operating conditions including particulate filter regeneration and engine operation with reduced intake system capacity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
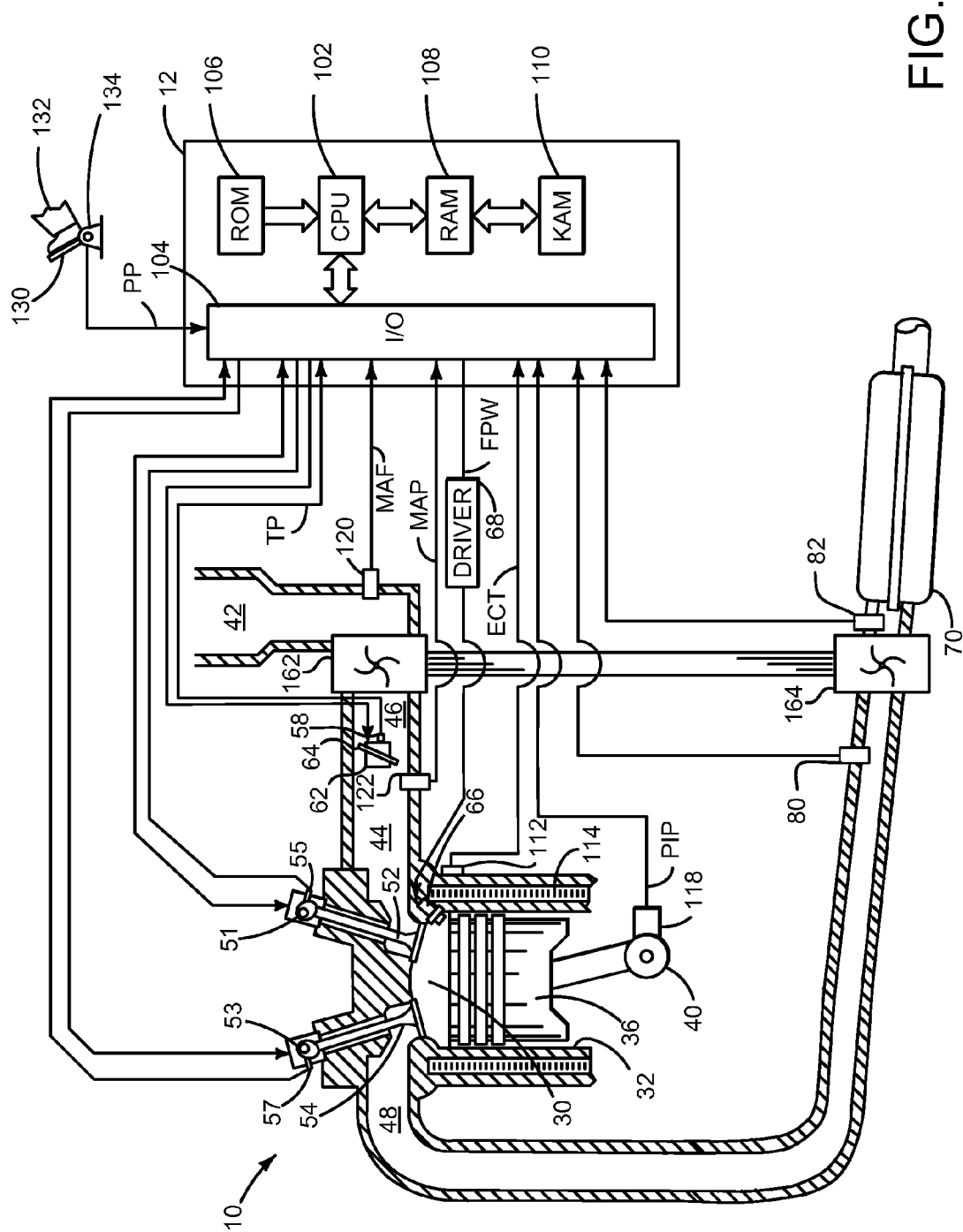
FIG. 1 shows a schematic depiction of an engine.
Figure 2:
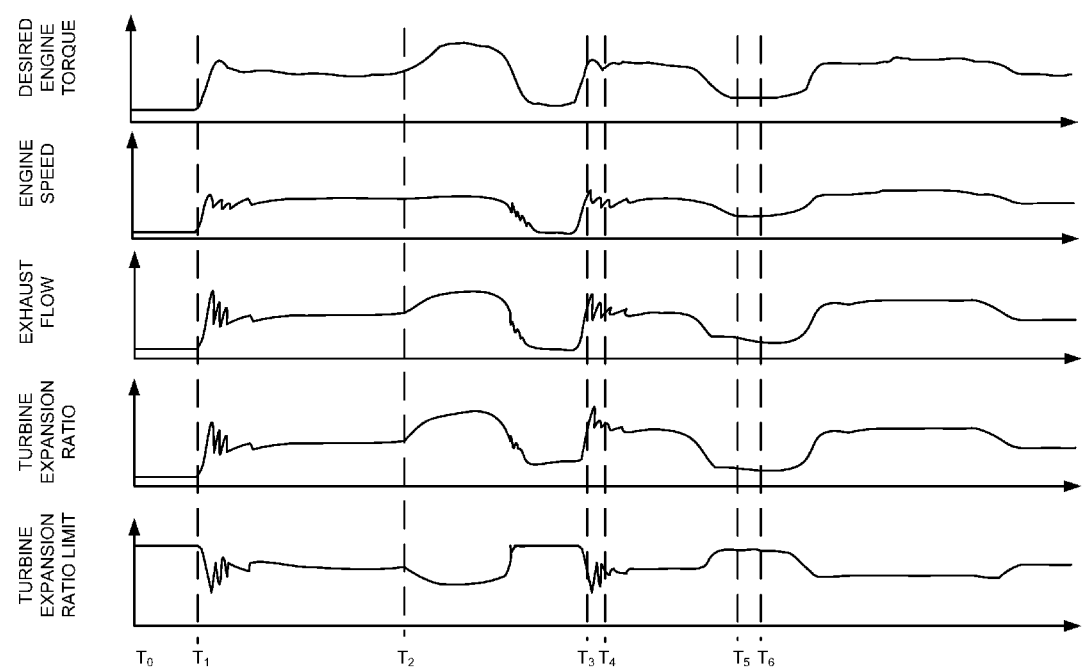
FIG. 2 shows simulated signals of interest during a vehicle drive cycle.
Figure 3:
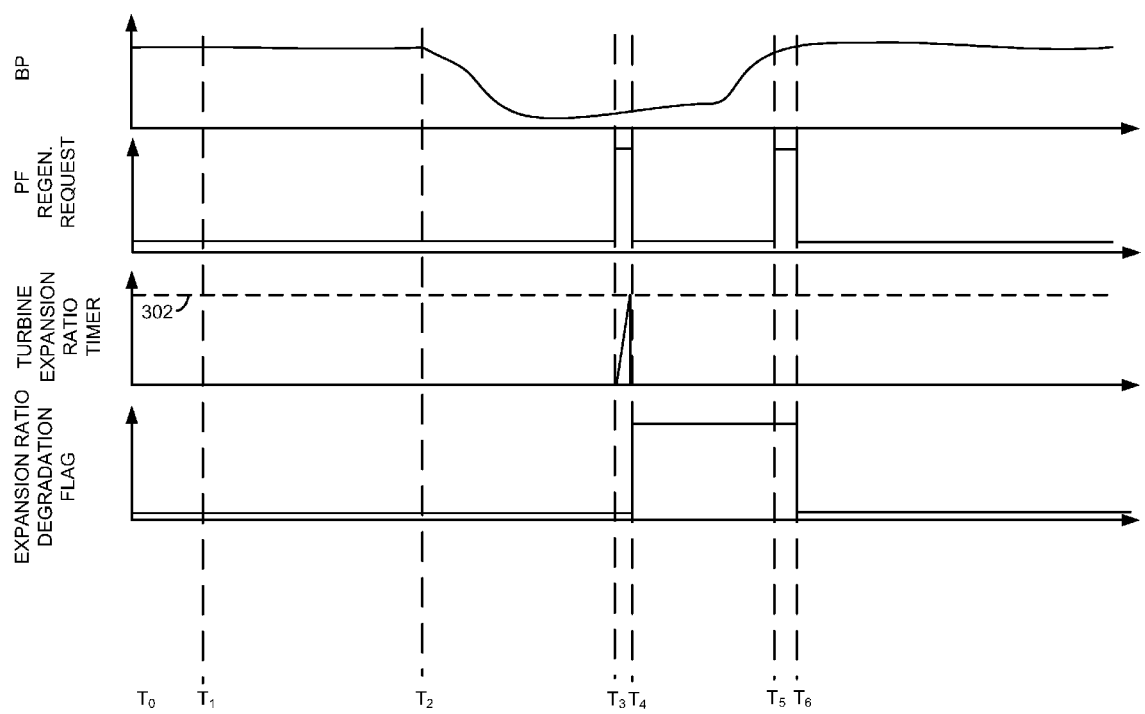
FIG. 3 shows further simulated signals of interest during the vehicle drive cycle shown in FIG. 2.
Figure 4:
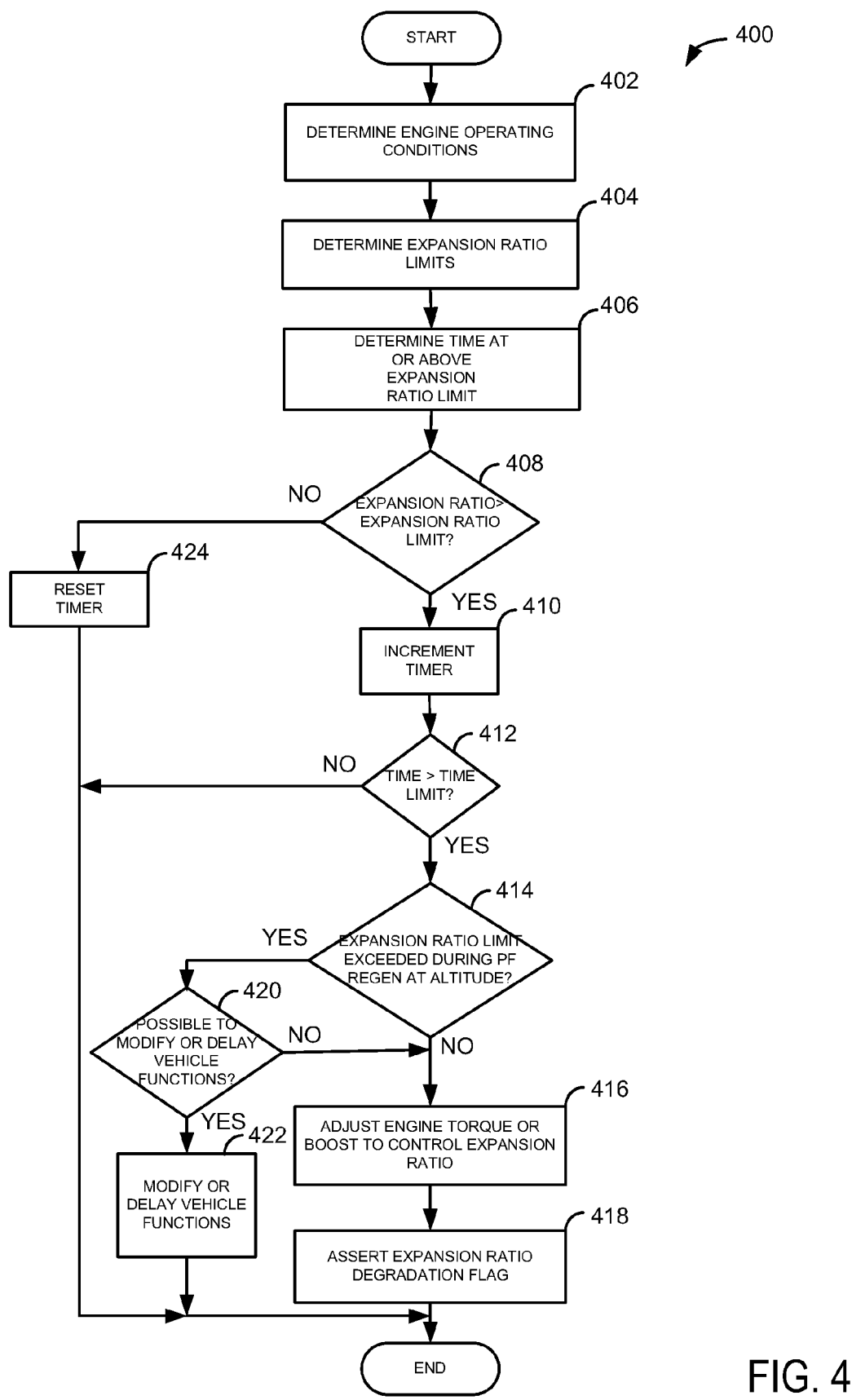
FIG. 4 shows a flowchart of an example method for limiting output of an engine in response to a turbine expansion ratio.

The present description is related to limiting output of an engine in response to an expansion ratio of a turbine. In one example, an expansion ratio in an exhaust passage having a turbine is a basis for limiting engine output. FIG. 1 shows one example embodiment of the boosted engine. FIGS. 2-3 show simulated signals of interest for a boosted engine during a simulated drive cycle. FIG. 4 shows a method for limiting engine output in response to a turbine expansion ratio.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66.

Combustion is initiated in combustion chamber 30 when fuel automatically ignites as piston approaches top-dead-center compression stroke. In other examples, a distributorless ignition system provides an ignition spark to combustion chamber 30 via a spark plug (not shown) in response to controller 12. In some examples, a universal Exhaust Gas Oxygen (UEGO) sensor (not shown) may be coupled to exhaust manifold 48 upstream of emissions device 70.

Emissions device 70 can include a particulate filter and catalyst bricks, in one example. In another example, multiple emission control devices, each with multiple bricks, can be used. Emissions device 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a pressure sensor 80 for sensing exhaust pressure upstream of turbine 164; a pressure sensor 82 for sensing exhaust pressure downstream of turbine 164; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Another example can include modeled signals for pressure sensor 80 for sensing exhaust pressure upstream of turbine 164 and a modeled signal for pressure sensor 82 for sensing exhaust pressure downstream of turbine 164.

During operation, each cylinder within engine 10 typically undergoes a four stroke or two stroke cycle: the four stroke cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine having an turbocharger; an exhaust system in communication with the turbocharger; an exhaust aftertreatment device positioned in the exhaust system; and a controller, the controller including instructions for adjusting operation of the engine in response to a turbine expansion ratio of the turbocharger exceeding a turbine expansion ratio limit. The engine system includes where the controller includes further instructions for adjusting fuel injection timing in response to the turbine expansion ratio exceeding the turbine expansion ratio limit. The engine system includes where the controller includes further instructions for adjusting a vane position of the turbocharger to modify turbocharger operation in response to the turbine expansion ratio exceeding the turbine expansion ratio limit. The engine system includes where the controller includes further instructions for limiting or modifying regeneration of a particulate filter in response to the turbine expansion ratio exceeding the turbine expansion ratio limit. The engine system includes where the controller includes further instructions for limiting an amount of fuel injected in response to the turbine expansion ratio exceeding the turbine expansion ratio limit. The engine system includes where the controller includes further instructions for indicating a condition of air intake system degradation in response to the turbine expansion ratio exceeding the turbine expansion ratio limit. The engine system further comprises a barometric pressure sensor or modeled barometric pressure signal for determining an altitude of the engine, and where the controller includes further instructions to limit or modify regeneration of a particulate filter in response to the barometric pressure sensor.

Referring now to FIGS. 2-3, prophetic signals of interest during an engine operating sequence are shown. FIG. 2 shows five signals of interest during the engine operating sequence. FIG. 3 shows four additional signals of interest during the engine operating sequence. Vertical markers $T_0$-$T_6$ identify particular times of interest during the operating sequence.

The first plot from the top of FIG. 2 shows desired engine torque versus time. Time starts at the left side of the plot and increases to the right. Desired engine torque is at its lowest value at the bottom of the plot and increases in magnitude toward the top of the plot.

The second plot from the top of FIG. 2 shows engine speed versus time. Time starts at the left side of the plot and increases to the right. Engine speed is at its lowest value at the bottom of the plot and increases toward the top of the plot.

The third plot from the top of FIG. 2 shows exhaust flow versus time. Time starts at the left side of the plot and increases to the right. The exhaust flow rate can be related to engine speed and engine load and may be expressed as a mass per unit time (e.g., KG/Hr).

The fourth plot from the top of FIG. 2 shows turbine expansion ratio versus time. Time starts at the left side of the plot and increases to the right. Turbine expansion ratio is at a higher level at the top of the plot. The turbine expansion ratio is at a lower level at the bottom of the plot.

The fifth plot from the top of FIG. 2 shows turbine expansion ratio limit versus time. Time starts at the left side of the plot and increases to the right. The turbine expansion ratio limit is at a higher level at the top of the plot. The turbine expansion ratio is at a lower level at the bottom of the plot. The turbine expansion ratio limit may vary with engine operating conditions.

The first plot from the top of FIG. 3 shows barometric pressure versus time. Time starts at the left side of the plot and increase to the right. Barometric pressure is highest at the top of the plot. When an engine is operated at higher altitude the barometric pressure is lower since air density decreases as altitude increases.

The second plot from the top of FIG. 3 shows a state of a particulate filter regeneration request. A particulate filter regeneration request is present when the particulate filter regeneration request is at a higher level. A particulate filter regeneration request is not present when the particulate filter regeneration request is at a lower level. A particulate filter regeneration request may be made when a pressure drop across a particulate filter exceeds a threshold pressure level.

The third plot from the top of FIG. 3 shows the status of a turbine expansion ratio timer. The time accumulated by the turbine expansion ratio timer increases when the turbine expansion ratio is greater than the turbine expansion ratio limit. Horizontal line 302 represents a threshold amount of time that the turbine expansion ratio has to exceed the turbine expansion ratio limit before the expansion ratio limit flag becomes asserted. In some examples, the threshold amount of time may vary as exhaust flow rate varies.

The fourth plot from the top of FIG. 3 shows an expansion ratio limit flag. The expansion ratio limit flag is asserted when the expansion ratio limit flag signal is at a higher level. The expansion ratio limit flag is not asserted when the limit flag signal is at a lower level. The expansion ratio limit flag provides an indication of a condition when the turbine expansion ratio exceeds the turbine expansion ratio limit for an amount of time greater than a threshold time.

At time $T_0$ (coincident with the Y axis), the engine is operating at a low desired engine torque condition, idle for example. Further, the engine speed and exhaust flow are also low at time $T_0$. The turbine expansion ratio limit is at a higher level when engine speed and desired engine torque are low.

FIG. 3 shows that at time $T_0$, barometric pressure is at a higher level indicating that the engine is close to sea level conditions. In addition, the expansion ratio timer is at a level of zero indicating that the turbine expansion ratio does not exceed the turbine expansion ratio limit. Further, a regeneration request for a particulate filter located in the exhaust path downstream of the turbine is not asserted, nor is the expansion ratio limit flag asserted.

At time $T_1$, desired engine torque begins to increase and stays at a higher level from just after $T_1$ to time $T_2$. Engine speed also increases after time $T_1$ and remains higher at time $T_2$. As desired engine torque and engine speed increase, the exhaust flow rate also increase from $T_1$ to $T_2$. Further, as engine operating conditions change between $T_1$ and $T_2$, the turbine expansion ratio limit varies and is reduced from the value shown at time $T_0$. Barometric pressure, particulate filter regeneration request, expansion ratio timer, and expansion ratio limit flag remain unchanged from $T_1$ to $T_2$.

At time $T_2$, the desired engine torque increases and then decreases as time approaches $T_3$. Engine speed increases slightly after $T_2$ and then decreases before increasing again shortly before $T_3$. The turbine expansion ratio increases as the exhaust flow rate increases. Thus, in this example, the turbine expansion ratio can be correlated with exhaust flow during at least some portions of the engine operating sequence. The turbine expansion ratio limit decreases after time $T_2$ during higher exhaust flow rates and then increases before time $T_3$. Barometric pressure is reduced between time $T_2$ and time $T_3$ indicating the engine is increasing in altitude. Particulate filter regeneration request, expansion ratio timer, and expansion ratio limit flag remain unchanged from $T_2$ to $T_3$.

At time $T_3$, desired engine torque, engine speed, exhaust flow, and turbine expansion ratio have increased over levels just prior to time $T_3$. Further, conditions where it is desirable to regenerate a particulate filter located in the engine exhaust stream are present (e.g., a threshold amount of particulate matter is stored in the particulate matter filter). Accordingly, a particulate filter regeneration request is asserted at time $T_3$. During some examples, fuel injection timing may be adjusted in response to a particulate filter regeneration request so that exhaust flow increases to elevate a temperature of particulate matter stored in the particulate filter. For example, injection timing may be retarded while the amount of fuel injected to the engine is increased. In this way, exhaust flow may be increased while the desired engine torque is maintained at a level requested by an operator of the engine.

Barometric pressure is at a lower level at time $T_3$. The turbine expansion ratio may increase at higher altitudes as compared to similar engine operating conditions where barometric pressure is higher at lower altitudes since the lower barometric pressure on the outlet side of the turbocharger turbine increases the pressure drop across the turbocharger turbine. Between time $T_3$ and $T_4$, the amount of time stored in the expansion ratio timer increases since the turbine expansion pressure ratio is greater than the turbine expansion pressure ratio limit. The amount of time accumulated in the expansion ratio timer increases until the expansion ratio timer equals or exceeds a threshold amount of time indicated by horizontal line 302 at time $T_4$. Once the expansion ratio timer exceeds the expansion ratio time limit, the expansion ratio limit flag is asserted at $T_4$ to indicate a condition of degradation.

Between time $T_4$ and $T_5$, desired engine torque, engine speed, exhaust flow, and turbine expansion ratio go from higher levels to lower levels. In addition, barometric pressure increases indicating that the engine is moving from a higher altitude to a lower altitude. Further, the expansion ratio timer, particulate filter regeneration request, and expansion ratio limit flag remain at the levels shown at time $T_4$.

At time $T_5$, barometric pressure is at a level where it is desirable to attempt a second regeneration of the particulate filter. In one example as shown by the method of FIG. 4, regeneration of the particulate filter may be delayed for a period of time to allow the engine to reach a lower altitude after attempted particulate filter regeneration at a higher altitude results in a turbine expansion ratio that exceeds the turbine expansion ratio limit. As such, the particulate filter regeneration request goes to a higher state at time $T_5$.

Between time $T_5$ and $T_6$, the particulate filter is regenerated by elevating the exhaust gas temperature. In one example, fuel injection timing is retarded during particulate filter regeneration to increase exhaust gas temperature. During particulate filter regeneration between time $T_5$ and $T_6$, the turbine expansion ratio is less than the turbine expansion ratio limit. Consequently, the expansion ratio timer does not increase from a value of zero and as a result the particulate filter is regenerated.

At time $T_6$, the particulate filter is regenerated and the expansion ratio limit flag is cleared. The expansion ratio limit flag may be cleared when a particulate filter is regenerated without the turbine expansion ratio exceeding the turbine expansion ratio limit. Since engine backpressure can be increased by particulate matter stored in a particulate filter, the expansion ratio limit flag can be cleared after particulate matter stored in the particulate filter is oxidized thereby lowering the engine exhaust backpressure. In other examples, the expansion ratio limit flag may be cleared by a technician after servicing the engine. After time $T_6$, the engine is operated without further particulate filter regeneration requests and the turbine expansion ratio is maintained at a level below the turbine expansion ratio limit. Consequently, the particulate filter regeneration request, expansion ratio timer, and expansion ratio limit flag remain at a lower level.

Referring now to FIG. 4, a method for limiting output of an engine in response to a turbine expansion ratio is shown. The method of FIGS. 4 is executable by a controller such as the controller shown in FIG. 1.

At 402, method 400 determines engine operating conditions. In one example, engine operating conditions included but are not limited to engine speed, engine load, ambient air pressure, intake manifold pressure, exhaust pressure upstream and downstream of a turbine, and ambient air temperature. Method 400 proceeds to 404 after engine operating conditions are determined.

At 404, method 400 determines a turbine expansion ratio limit. In one example, a table indexed by engine speed and engine load outputs a turbine expansion ratio limit. Thus, a plurality of turbine expansion ratio limits is provided for a plurality of engine operating conditions. The turbine expansion ratio limits may be empirically determined. In one example, the turbine expansion ratio limits decrease with increasing engine exhaust flow rates. Method 400 proceeds to 406 after turbine expansion ratio limits are determined.

At 406, method 400 determines an amount of time that the turbine expansion ratio may exceed the turbine expansion ratio limit before a degraded condition exits. In one example, the amount of time that the turbine expansion ratio may exceed the turbine expansion ratio limit is based on or in response to the turbine expansion ratio limit. For example, if the turbine expansion ratio is 1.5, the turbine expansion ratio may exceed the turbine expansion ratio limit for 2.2 seconds before a limit flag is set. On the other hand, if the turbine expansion ratio is 1.8, the turbine expansion ratio may exceed the turbine expansion ratio limit for 2.0 seconds before a limit flag is set. In this way, the amount of time that the turbine expansion ratio exceeds the turbine expansion ratio limit before a limit flag is set may be varied in response to the turbine expansion ratio.

In another example, the amount of time the turbine expansion ratio may exceed the turbine expansion ratio limit may be based on or in response to an exhaust gas flow rate. For example, if the exhaust gas flow rate is 100 KG/hr, the turbine expansion ratio may exceed the turbine expansion ratio limit for 2.2 seconds before a limit flag is set. On the other hand, if the exhaust gas flow rate is 200 KG/hr, the turbine expansion ratio may exceed the turbine expansion ratio limit for 1.0 second before a limit flag is set. Method 400 proceeds to 408 after an amount of time the turbine expansion ratio may exceed the turbine expansion ratio limit without asserting a limit flag is determined.

At 408, method 400 determines if the turbine expansion ratio exceeds the turbine expansion ratio limit. In one example, the turbine expansion ratio is determined by dividing the exhaust pressure upstream of a turbine by exhaust pressure downstream of the turbine. In another example, a pressure difference across the turbine may be substituted for the turbine expansion ratio. The pressure difference across the exhaust turbine may be determined from a delta pressure sensor that senses exhaust pressure upstream and downstream of the exhaust turbine and outputs a signal in response to a difference between exhaust pressure upstream of the turbine and exhaust pressure downstream of the turbine. If the turbine expansion ratio exceeds the turbine expansion ratio limit or if the turbine delta pressure exceeds the turbine pressure delta pressure limit, method 400 proceeds to 410. Otherwise, method 400 proceeds to 424.

It should also be mentioned that is some examples a change in turbine expansion ratio over time during substantially similar engine operating conditions may be tracked at 408. For example, if an engine is operating at 0.5 load and 2000 RPM a value of turbine expansion ratio may be stored to memory. At a later time when the engine is again operating at 0.5 load and 2000 RPM, a second value of turbine expansion ratio may be stored to memory. Thus, a rate of change in the turbine expansion ratio may be determined and stored to memory.

In addition to or in place of judging whether or not the turbine expansion ratio exceeds the turbine expansion ratio limit, it may be judged whether or not the rate of change in turbine expansion ratio exceeds a threshold rate of change. In some examples, a rate of change in the turbine expansion ratio may provide an indication of degradation of an air intake system (e.g., a partially obstructed air filter). If the rate of change in turbine expansion ratio exceeds a threshold rate of change, method 400 proceeds to 410.

At 410, method 400 increments a timer to track an amount of time the turbine expansion ratio exceeds the turbine expansion ratio limit. In other examples, the timer may be incremented when turbine delta pressure is greater than the turbine delta pressure limit. Method 400 proceeds to 412 after the timer is incremented.

At 412, method 400 judges whether or not the amount of time stored in the timer at 410 exceeds a predetermined time limit determined at 406. If the amount of time stored in the timer exceeds the amount of time determined at 406, method 400 proceeds to 414. Otherwise, method 400 proceeds to exit.

At 414, method 400 judges whether or not the turbine expansion ratio exceeds the turbine expansion ratio limit during regeneration of a particulate filter at a higher altitude. Alternatively, method 400 may judge whether or not the turbine delta pressure exceeds the turbine delta pressure limit during regeneration of the particulate filter at a higher altitude. As previously mentioned, the engine exhaust flow rate may be increased during regeneration of a particulate filter. If the particulate filter is regenerated at an altitude above sea level, the barometric pressure may be reduced so that the turbine expansion ratio increases above the turbine expansion ratio limit. Consequently, the turbine expansion ratio limit may be exceeded at least partially due to engine operation at increased altitude. If method 400 judges that the turbine expansion ratio limit or turbine delta pressure limit is exceeded during particulate filter regeneration, method 400 proceeds to 420. Otherwise, method 400 proceeds to 416.

At 416, method 400 adjusts engine torque or boost limits to control the turbine expansion ratio. In one example, a turbocharger waste gate may be adjusted according to a second schedule different from a first waste gate opening schedule when the turbine expansion ratio exceeds a turbine expansion ratio limit for greater than a threshold amount of time. By opening a turbocharger waste gate earlier and in an amount greater than during nominal engine operating conditions, it is possible to adjust engine boost such that the turbine expansion ratio limit is not exceeded. In another example, fuel injection timing may be adjusted to limit engine torque so that the turbine expansion ratio limit is not exceeded. For example, fuel injection amount may be reduced and injection timing may be retarded so that less exhaust flow may be produced during engine operation. By adjusting fuel amount and timing, it is possible to limit engine speed so that engine exhaust flow and the turbine expansion ratio are limited.

In an alternative example, a turbocharger vane position may be adjusted in response to a turbine expansion ratio exceeding a turbine expansion ratio limit. For example, vane position may be adjusted to make the turbocharger less efficient when the turbine expansion ratio exceeds the turbine expansion ratio limit. Method 400 proceeds to 418 after engine torque and/or engine boost are adjusted.

At 418, method 400 asserts the expansion ratio limit flag. The expansion ratio limit flag may remain asserted until reset by a technician or until predetermined conditions are met. For example, an expansion ratio limit flag may be reset if a particulate filter is regenerated and the expansion ratio does not exceed the expansion ratio limit during conditions similar to when the expansion ratio limit flag was set. Method 400 proceeds to exit after the expansion ratio limit flag is asserted.

At 420, method 400 judges whether or not it is possible to delay or modify regeneration of a particulate filter. In one example, regeneration of a particulate filter may be delayed when a pressure drop across a particulate filter is less than a threshold amount. If it is judged to not delay particulate filter regeneration, method 400 proceeds to 416. Otherwise, method 400 proceeds to 422.

At 422, method 400 delays or modifies particulate filter regeneration until barometric pressure is greater than a predetermined amount or until a threshold pressure drop across the particulate filter is exceeded. If the engine is operated at a lower altitude so that barometric pressure increases, particulate filter regeneration may be reattempted. For example, regeneration of a particulate filter may be first attempted at an altitude of 3,000 meters. If the turbine expansion ratio exceeds the turbine expansion ratio limit during particulate filter regeneration, particulate filter regeneration may be stopped at the 3,000 meter altitude and restarted at an altitude of 1,000 meters. Alternatively, if the pressure drop across the particulate filter increases beyond a threshold pressure as particulate matter is stored in the particulate filter; particulate filter regeneration may be reattempted when the pressure drop across the particulate filter exceeds a predetermined pressure threshold. Further, in some examples, particulate filter regeneration may be modified by attempting to regenerate at different engine operating conditions. For example, particulate filter regeneration may be attempted at a lower engine mass flow rate and with increased fuel injection timing retard. Method 400 exits after delaying particulate filter regeneration.

At 424, method 400 resets the turbine expansion ratio timer. In one example, the turbine expansion ratio timer is cleared as soon as the turbine expansion ratio is less than the turbine expansion ratio limit. In another example, the turbine expansion ratio timer is cleared after the turbine expansion ratio is less than the turbine expansion ratio limit for more than a predetermined amount of time. For example, the turbine expansion ratio timer may be cleared if the turbine expansion ratio does not exceed the turbine expansion ratio limit for 5 seconds. However, if the turbine expansion ratio exceeds the turbine expansion ratio limit for 1 second, and then the turbine expansion ratio is less than the turbine expansion ratio limit for 0.5 seconds, and then the turbine expansion ratio is greater than the turbine expansion ratio limit for 4 seconds, the turbine expansion ratio timer will accumulate a time of 5 seconds. If the accumulated time exceeds the expansion ratio time limit, the turbine expansion ratio limit flag is asserted. Method 400 exits after deciding whether or not to reset the expansion ratio timer.

Thus, the method of FIG. 4 provides for an engine operating method, comprising:

operating an engine with a turbocharger; adjusting operation of the engine in response to a turbine expansion ratio exceeding a turbine expansion ratio limit of the turbocharger, the turbine expansion ratio limit varying in response to an exhaust gas flow rate. The engine operating method including where adjusting operation of the engine includes reducing an available amount of engine torque. The engine operating method including where adjusting operation of the engine includes adjusting an actuator to limit the turbine expansion ratio. The engine operating method further comprises limiting regeneration of a particulate filter when the turbine expansion ratio exceeds the turbine expansion ratio limit. The engine operating method further comprises reinitiating regeneration of the particulate filter when an altitude of the engine decreases. The engine operating method including where reinitiating regeneration of the particulate filter automatically begins at a predetermined change in the altitude of the engine.

The method of FIG. 4 also provides for an engine operating method, comprising: operating an engine with a turbocharger; adjusting operation of the engine in response to a turbine expansion ratio exceeding a turbine expansion ratio limit of the turbocharger when the turbine expansion ratio limit is exceeded for a predetermined amount of time, the turbine expansion ratio limit being based on an exhaust gas flow rate; and continuing to operate the engine without responding to the turbine expansion ratio limit when the turbine expansion ratio limit is not exceeded for the predetermined amount of time. The engine operating method further comprises limiting regeneration of a particulate filter when the turbine expansion ratio exceeds the turbine expansion ratio limit. The engine operating method further comprises tracking a change in the turbine expansion ratio over time during substantially similar engine operating conditions. The engine operating method further comprises providing an indication of degradation when the rate of change in turbine expansion ratio over a predetermined amount of time exceeds a threshold level. The engine operating method further comprises providing an indication of an engine air intake degradation in response to the rate of change in turbine expansion ratio exceeding the threshold level. The engine operating method further comprises reducing an available amount of torque output of the engine in response to the turbine expansion ratio exceeding the turbine expansion ratio limit. The engine operating method includes where reducing the available amount of torque output of the engine includes limiting fuel injection timing of the engine.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
   operating an engine with a turbocharger;
   adjusting operation of the engine in response to a turbine expansion ratio exceeding a turbine expansion ratio limit of the turbocharger, the turbine expansion ratio limit varying in response to an exhaust gas flow rate.

2. The engine operating method of claim 1, where the adjusting operation of the engine includes reducing an available amount of engine torque.

3. The engine operating method of claim 1, where the adjusting operation of the engine includes adjusting an actuator to limit the turbine expansion ratio.

4. The engine operating method of claim 1, further comprising limiting regeneration of a particulate filter when the turbine expansion ratio exceeds the turbine expansion ratio limit.

5. The engine operating method of claim 4, further comprising reinitiating regeneration of the particulate filter when an altitude of the engine decreases.

6. The engine operating method of claim 5, where the reinitiating regeneration of the particulate filter automatically begins at a predetermined change in the altitude of the engine.

7. An engine operating method, comprising:
   operating an engine with a turbocharger;
   adjusting operation of the engine in response to a turbine expansion ratio exceeding a turbine expansion ratio limit of the turbocharger when the turbine expansion ratio limit is exceeded for a predetermined amount of time, the turbine expansion ratio limit being based on an exhaust gas flow rate; and
   continuing to operate the engine without responding to the turbine expansion ratio limit when the turbine expansion ratio limit is not exceeded for the predetermined amount of time.

8. The engine operating method of claim 7, further comprising limiting regeneration of a particulate filter when the turbine expansion ratio exceeds the turbine expansion ratio limit.

9. The engine operating method of claim 7, further comprising reducing an available amount of torque output of the engine in response to the turbine expansion ratio exceeding the turbine expansion ratio limit.

10. The engine operating method of claim 9, where reducing the available amount of torque output of the engine includes limiting fuel injection timing of the engine.

11. The engine operating method of claim 7, further comprising tracking a change in the turbine expansion ratio over time.

12. The engine operating method of claim 11, further comprising providing an indication of degradation when a rate of change in the turbine expansion ratio over the predetermined amount of time exceeds a threshold level.

13. The engine operating method of claim 12, further comprising providing an indication of an engine air intake degradation in response to the rate of change in the turbine expansion ratio exceeding the threshold level.

14. An engine system, comprising:
   an engine having a turbocharger;
   an exhaust system in communication with the turbocharger;
   an exhaust after treatment device positioned in the exhaust system; and
   a controller, the controller including instructions for adjusting operation of the engine in response to a turbine expansion ratio of the turbocharger exceeding a turbine expansion ratio limit, and instructions for indicating a condition of air intake system degradation in response to the turbine expansion ratio exceeding the turbine expansion ratio limit.

15. The engine system of claim 14, where the controller includes further instructions for adjusting fuel injection timing in response to the turbine expansion ratio exceeding the turbine expansion ratio limit.

16. The engine system of claim 14, where the controller includes further instructions for adjusting a vane position of the turbocharger to modify turbocharger operation in response to the turbine expansion ratio exceeding the turbine expansion ratio limit.

17. The engine system of claim 14, where the controller includes further instructions for limiting or modifying regeneration of a particulate filter in response to the turbine expansion ratio exceeding the turbine expansion ratio limit.

18. The engine system of claim 14, where the controller includes further instructions for limiting an amount of fuel injected in response to the turbine expansion ratio exceeding the turbine expansion ratio limit.

19. The engine system of claim 14, further comprising a barometric pressure sensor for determining an altitude of the engine, and where the controller includes further instructions to limit or modify regeneration of a particulate filter in response to the barometric pressure sensor.

* * * * *